(12) United States Patent
Kazour et al.

(10) Patent No.: US 11,060,493 B2
(45) Date of Patent: Jul. 13, 2021

(54) FUEL PUMP FOR GASOLINE DIRECT INJECTION

(71) Applicant: DELPHI TECHNOLOGIES IP LIMITED, St. Michael (BB)

(72) Inventors: Youssef Kazour, Pittsford, NY (US); Joseph G. Spakowski, Rochester, NY (US)

(73) Assignee: DELPHI TECHNOLOGIES IP LIMITED

( * ) Notice: Subject to any disclaimer, the term of this patent is extended or adjusted under 35 U.S.C. 154(b) by 32 days.

(21) Appl. No.: 16/369,337

(22) Filed: Mar. 29, 2019

(65) Prior Publication Data

US 2020/0309076 A1 Oct. 1, 2020

(51) Int. Cl.
| | |
|---|---|
| F02M 59/46 | (2006.01) |
| F02M 59/02 | (2006.01) |
| F02M 59/44 | (2006.01) |
| F04B 53/10 | (2006.01) |
| F16K 17/04 | (2006.01) |
| F16K 25/00 | (2006.01) |
| F16K 31/26 | (2006.01) |

(52) U.S. Cl.
CPC .......... *F02M 59/46* (2013.01); *F02M 59/025* (2013.01); *F02M 59/442* (2013.01); *F04B 53/10* (2013.01); *F02M 2200/26* (2013.01); *F16K 17/0406* (2013.01); *F16K 25/005* (2013.01); *F16K 31/26* (2013.01)

(58) Field of Classification Search
CPC .... F02M 59/46; F02M 59/442; F02M 59/025; F02M 2200/26; F04B 53/00; F04B 53/10; F16K 15/044; F16K 15/048; F16K 15/06; F16K 25/005; F16K 31/26; F16K 17/0406
See application file for complete search history.

(56) References Cited

U.S. PATENT DOCUMENTS

| | | |
|---|---|---|
| 6,302,136 B1 | 10/2001 | Weaver et al. |
| 9,556,836 B2 | 1/2017 | Morel et al. |
| 2003/0089343 A1 | 5/2003 | Yamaguchi et al. |

(Continued)

FOREIGN PATENT DOCUMENTS

| | | |
|---|---|---|
| GB | 2553484 A | 3/2018 |
| JP | 10339231 A | 12/1998 |
| WO | 2016037771 A1 | 3/2016 |

*Primary Examiner* — Kenneth J Hansen
(74) *Attorney, Agent, or Firm* — Joshua M. Haines

(57) ABSTRACT

A fuel pump includes a fuel pump housing made of stainless steel and having a pumping chamber therewithin, a plunger bore extending thereinto, an inlet passage extending thereinto, and an outlet passage extending thereinto. A pumping plunger reciprocates within the plunger bore such that an intake stroke of the pumping plunger increases volume of the pumping chamber and a compression stroke of the pumping plunger decreases volume of the pumping chamber. An outlet valve controls fuel flow from the pumping chamber out of the fuel pump housing. The outlet valve includes an outlet valve seating surface formed by the fuel pump housing within the outlet passage such that a nitrided layer extends from the outlet valve seating surface into the fuel pump housing. The outlet valve also includes an outlet valve member within the outlet passage which is moveable between a seated position and an unseated position.

12 Claims, 9 Drawing Sheets

(56) References Cited

U.S. PATENT DOCUMENTS

| | | | |
|---|---|---|---|
| 2004/0118140 A1* | 6/2004 | Umemura | F04B 27/1804 |
| | | | 62/217 |
| 2007/0079810 A1* | 4/2007 | Usui | F02M 63/028 |
| | | | 123/467 |
| 2009/0078906 A1* | 3/2009 | Shafer | F02M 61/18 |
| | | | 251/368 |
| 2012/0152112 A1 | 6/2012 | Yoshimura et al. | |

* cited by examiner

FUEL PUMP FOR GASOLINE DIRECT INJECTION

TECHNICAL FIELD OF INVENTION

The present invention relates to a fuel pump for gasoline direct injection, and more particularly to an outlet valve arrangement for such a fuel pump.

BACKGROUND OF INVENTION

Fuel systems in modern internal combustion engines fueled by gasoline, particularly for use in the automotive market, employ gasoline direct injection (GDi) where fuel injectors are provided which inject fuel directly into combustion chambers of the internal combustion engine. In such systems employing GDi, fuel from a fuel tank is supplied under relatively low pressure by a low-pressure fuel pump which is typically an electric fuel pump located within the fuel tank. The low-pressure fuel pump supplies the fuel to a high-pressure fuel pump which typically includes a pumping plunger in a fuel pump housing. The pumping plunger is reciprocated by a camshaft of the internal combustion engine in order to further pressurize the fuel in a pumping chamber of the fuel pump housing, thereby supplying high-pressure to fuel injectors which inject the fuel directly into the combustion chambers of the internal combustion engine. An outlet valve is typically included in an outlet passage of the fuel pump housing in order to control outlet of fuel from the pumping chamber and such that the outlet valve prevents flow of fuel back into the pumping chamber, particularly during an intake stroke of the pumping plunger.

Due to the corrosive characteristics of gasoline and forces generated during operation, the fuel pump housing of high-pressure fuel pumps for GDi are typically made from high-strength stainless steel. The fuel pump housing must remain unhardened in order to facilitate welding of various components thereto, for example, a pressure pulsation damper housing, outlet fitting, and inlet valve components. As a result, the outlet valve in high-pressure fuel pumps for GDi typically includes an assembly which includes a valve seat made from hardened stainless steel, the valve seat being distinct from the fuel pump housing. The valve seat is made from hardened stainless steel in order to be resistive to the corrosive characteristics of the gasoline and to resist wear from the cyclic impact of an outlet valve member therewith during operation. This valve seat is expensive to manufacture due to the material and processes involved. In addition, the valve seat must be sealed to the fuel pump housing in order for proper function. This seal is typically accomplished with a press fit interface between the valve seat and the fuel pump housing where this press fit interface requires tight size tolerances and surface finish tolerances on both the valve seat and the fuel pump housing which adds further cost.

What is needed is a fuel pump with an outlet valve which minimizes or eliminates one or more of the shortcomings as set forth above.

SUMMARY OF THE INVENTION

Briefly described, a fuel pump in accordance with the present invention includes a fuel pump housing made of stainless steel and having an outer surface, the fuel pump housing including a pumping chamber therewithin, a plunger bore extending thereinto from the outer surface to the pumping chamber, an inlet passage extending thereinto from the outer surface to the pumping chamber which allows fuel to flow into the pumping chamber, and an outlet passage extending thereinto from the outer surface to the pumping chamber which allows fuel to flow out of the pumping chamber. The fuel pump also includes a pumping plunger which reciprocates within the plunger bore along a plunger bore axis such that an intake stroke of the pumping plunger increases volume of the pumping chamber and a compression stroke of the pumping plunger decreases volume of the pumping chamber. The fuel pump also includes an outlet valve which controls fuel flow from the pumping chamber out of the fuel pump housing. The outlet valve includes an outlet valve seating surface formed by the fuel pump housing within the outlet passage such that a nitrided layer extends from the outlet valve seating surface into the fuel pump housing. The outlet valve also includes an outlet valve member within the outlet passage, the outlet valve member being moveable between 1) a seated position in which the outlet valve member engages the outlet valve seating surface, thereby preventing fluid communication through the outlet passage and 2) an unseated position in which the outlet valve member is offset relative to the outlet valve seating surface, thereby providing fluid communication through the outlet passage. The fuel pump which includes the outlet valve seating surface formed by the fuel pump housing reduces the number of components and lowers the overall cost of manufacture.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
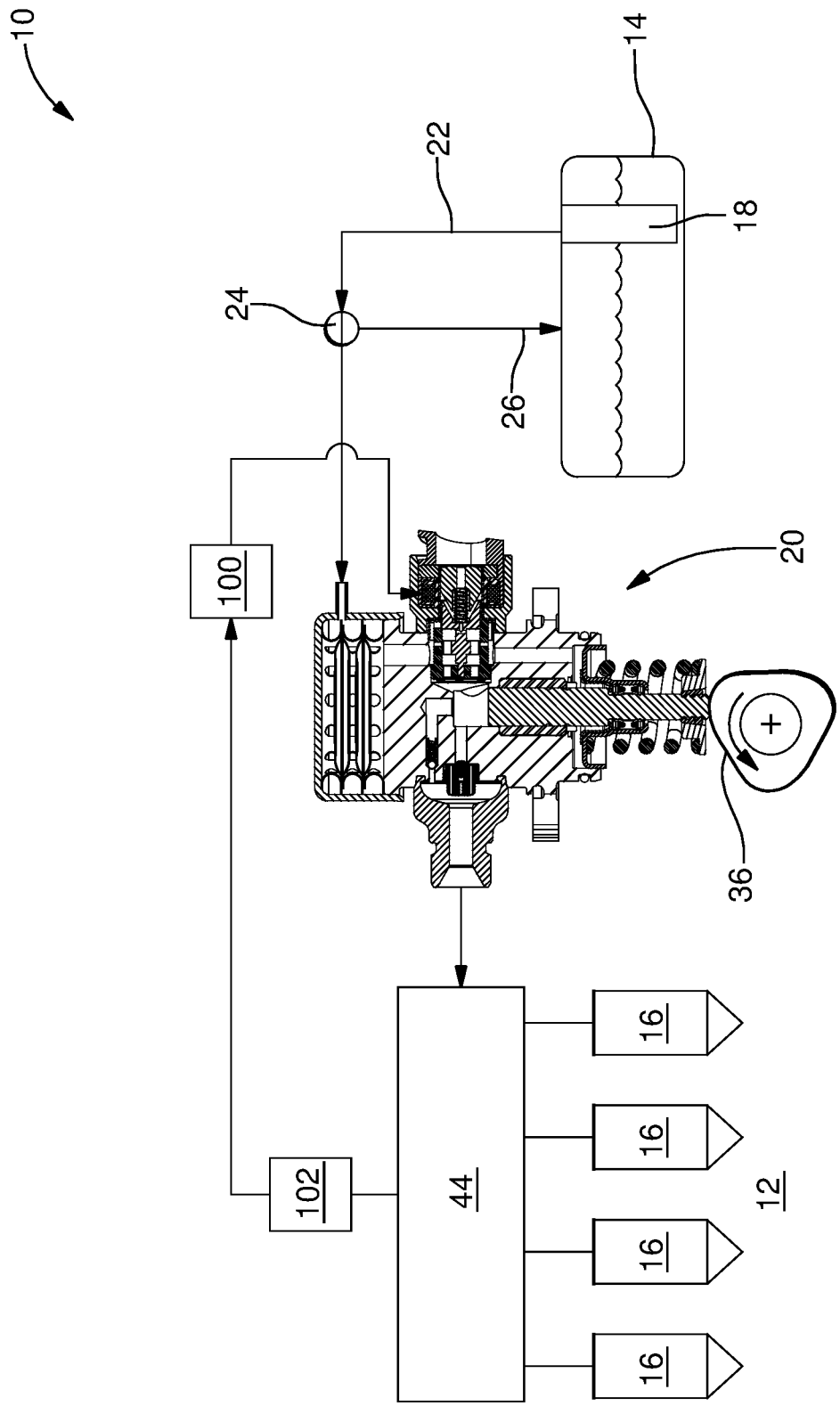
FIG. 1 is a schematic view of a fuel system including a fuel pump in accordance with the present invention.

In accordance with a preferred embodiment of this invention and referring initially to FIG. 1, a fuel system 10 for an internal combustion engine 12 is shown is schematic form. Fuel system 10 generally includes a fuel tank 14 which holds a volume of fuel to be supplied to internal combustion engine 12 for operation thereof; a plurality of fuel injectors 16 which inject fuel directly into respective combustion chambers (not shown) of internal combustion engine 12; a low-pressure fuel pump 18; and a high-pressure fuel pump 20 where the low-pressure fuel pump 18 draws fuel from fuel tank 14 and elevates the pressure of the fuel for delivery to high-pressure fuel pump 20 where the high-pressure fuel pump 20 further elevates the pressure of the fuel for delivery to fuel injectors 16. By way of non-limiting example only, low-pressure fuel pump 18 may elevate the pressure of the fuel to about 500 kPa or less and high-pressure fuel pump 20 may elevate the pressure of the fuel to above about 14 MPa. While four fuel injectors 16 have been illustrated, it should be understood that a lesser or greater number of fuel injectors 16 may be provided.

As shown, low-pressure fuel pump 18 may be provided within fuel tank 14, however low-pressure fuel pump 18 may alternatively be provided outside of fuel tank 14. Low-pressure fuel pump 18 may be an electric fuel pump as are well known to a practitioner of ordinary skill in the art. A low-pressure fuel supply passage 22 provides fluid communication from low-pressure fuel pump 18 to high-pressure fuel pump 20. A fuel pressure regulator 24 may be provided such that fuel pressure regulator 24 maintains a substantially uniform pressure within low-pressure fuel supply passage 22 by returning a portion of the fuel supplied by low-pressure fuel pump 18 to fuel tank 14 through a fuel return passage 26. While fuel pressure regulator 24 has been illustrated in low-pressure fuel supply passage 22 outside of fuel tank 14, it should be understood that fuel pressure regulator 24 may be located within fuel tank 14 and may be integrated with low-pressure fuel pump 18.

Figure 2:
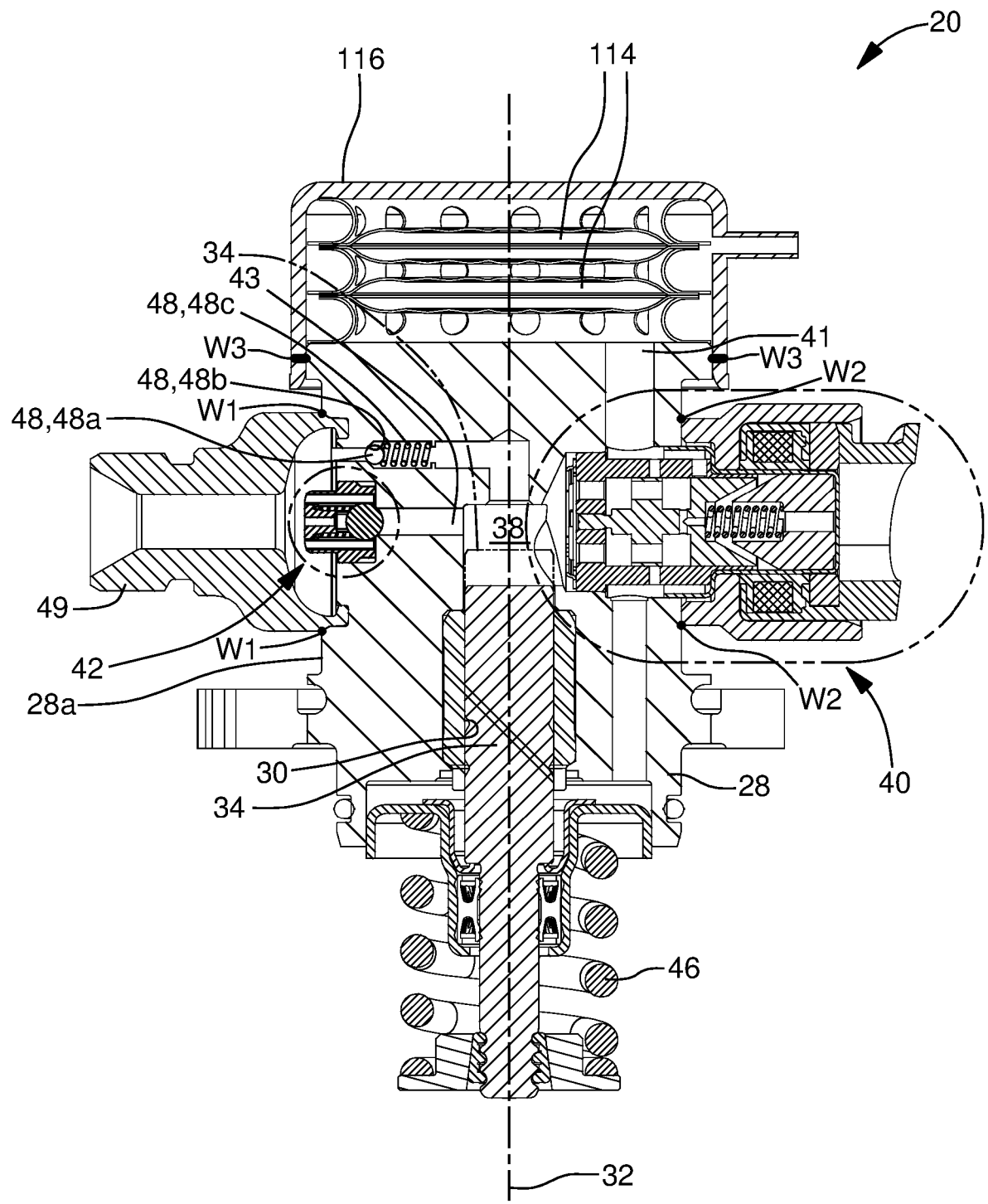
FIG. 2 is a cross-sectional view of the fuel pump of FIG. 1.
Figure 3:
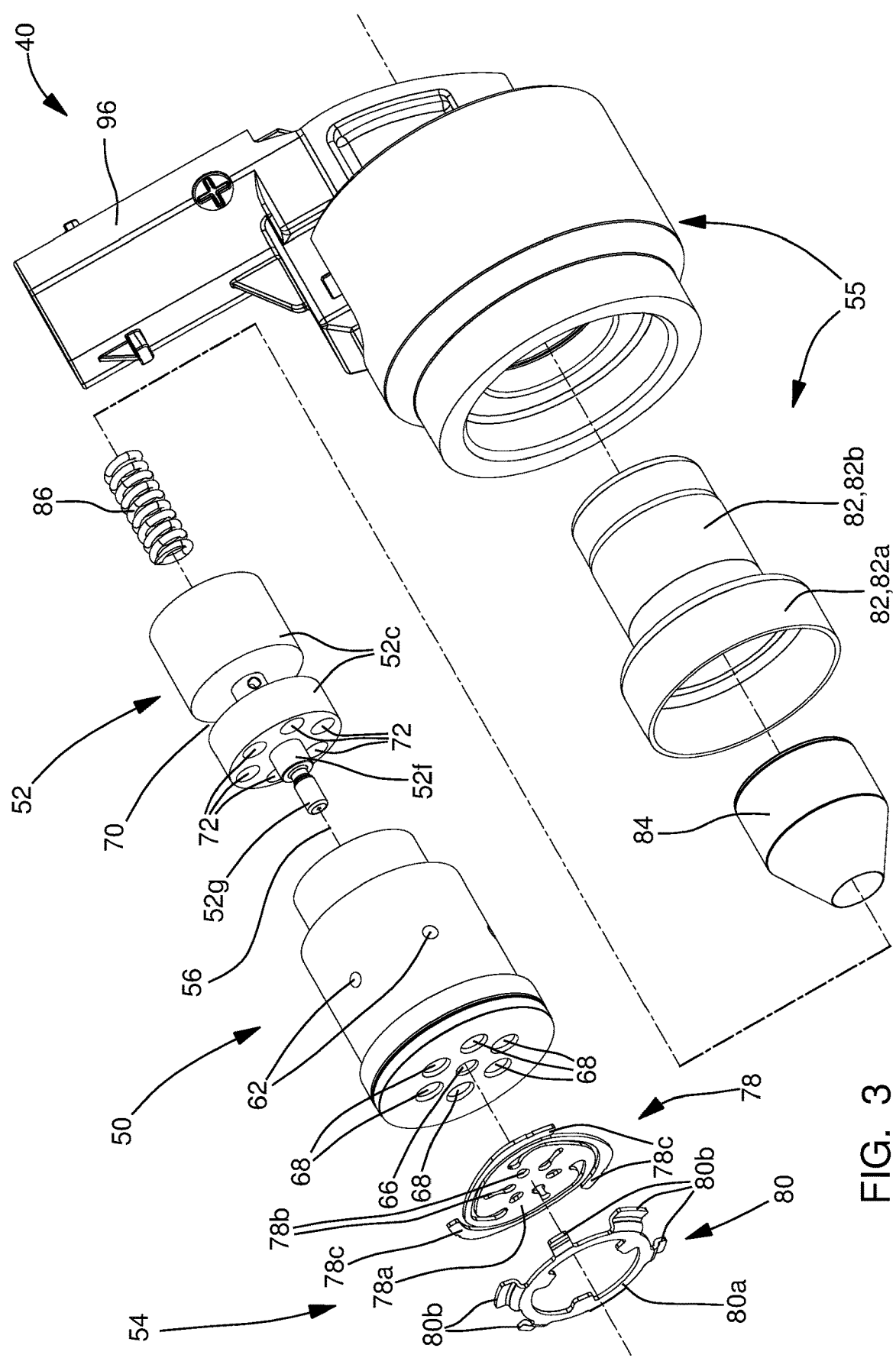
FIG. 3 is an exploded isometric view of an inlet valve assembly of the fuel pump of FIGS. 1 and 2.

Now with additional reference to FIG. 2, high-pressure fuel pump 20 includes a fuel pump housing 28 which is made of stainless steel in order to provide compatibility with gasoline which is pressurized by high-pressure fuel pump 20 and supplied to internal combustion engine 12. In one preferable example, fuel pump housing 28 may be made of 415 stainless steel which provides characteristics well suited for welding other elements thereto which will be described in greater detail later. Fuel pump housing 28 includes an outer surface 28a such that a plunger bore 30 extends into fuel pump housing 28 from outer surface 28a. Plunger bore 30 extends along, and is centered about, a plunger bore axis 32. As shown, plunger bore 30 may be defined by a combination of an insert and directly by fuel pump housing 28. Alternatively, the insert may be omitted and plunger bore 30 may be defined entirely by fuel pump housing 28. High-pressure fuel pump 20 also includes a pumping plunger 34 which is located within plunger bore 30 and reciprocates within plunger bore 30 along plunger bore axis 32 based on input from a rotating camshaft 36 of internal combustion engine 12 (shown only in FIG. 1). A pumping chamber 38 is defined within fuel pump housing 28, and more specifically, pumping chamber 38 is defined by plunger bore 30 and pumping plunger 34. An inlet valve assembly 40 of high-pressure fuel pump 20 is located within a pump housing inlet passage 41 of fuel pump housing 28 such that pump housing inlet passage 41 extends into fuel pump housing 28 from outer surface 28a and selectively allows fuel from low-pressure fuel pump 18 to enter pumping chamber 38 while an outlet valve 42 is located within an outlet passage 43 of fuel pump housing 28 which extends thereinto from outer surface 28a and selectively allows fuel to be communicated from pumping chamber 38 to fuel injectors 16 via a fuel rail 44 to which each fuel injector 16 is in fluid communication. In operation, reciprocation of pumping plunger 34 causes the volume of pumping chamber 38 to increase during an intake stroke of pumping plunger 34 (downward as oriented in FIG. 2) in which a plunger return spring 46 causes pumping plunger 34 to move downward, and conversely, the volume of pumping chamber 38 decreases during a compression stroke (upward as oriented in FIG. 2) in which camshaft 36 causes pumping plunger 34 to move upward against the force of plunger return spring 46. In this way, fuel is selectively drawn into pumping chamber 38 during the intake stroke, depending on operation of inlet valve assembly 40 as will be described in greater detail later, and conversely, fuel is pressurized within pumping chamber 38 by pumping plunger 34 during the compression stroke and discharged through outlet valve 42, as will be described in greater detail later, under pressure to fuel rail 44 and fuel injectors 16. It should be noted that outlet valve 42 is a one-way valve which allows fuel to flow from pumping chamber 38 toward fuel rail 44, but prevents flow in the opposite direction. For clarity, pumping plunger 34 is shown in solid lines in FIG. 2 to represent the intake stroke and pumping plunger 34 is shown in phantom lines in FIG. 2 to represent the compression stroke. High-pressure fuel pump 20 also includes a pressure relief valve assembly 48 which is arranged downstream of outlet valve 42 in order to provide a fluid path back to pumping chamber 38 if the pressure downstream of outlet valve 42 reaches a predetermined limit which may pose an unsafe operating condition if left unmitigated. As shown in the figures, an outlet fitting 49 is attached to fuel pump housing 28 and receives fuel that is discharged from outlet valve 42 in order to communicate the fuel to fuel rail 44. Also as shown, the interior of outlet fitting 49 is also in fluid communication with pressure relief valve assembly 48, thereby providing a path to pressure relief valve assembly 48. As shown in FIG. 2, outlet fitting 49 may be fixed to fuel pump housing 28 by welding as indicated by the darkened area designated by reference character W1.

Pressure relief valve assembly 48 generally includes a pressure relief valve member 48a, a pressure relief valve seat 48b, and a pressure relief valve spring 48c. Pressure relief valve member 48a, illustrated by way of non-limiting example only as a ball, is biased toward pressure relief valve seat 48b by pressure relief valve spring 48c where pressure relief valve spring 48c is selected to allow pressure relief valve member 48a to unseat from pressure relief valve seat 48b when a predetermined presser differential between pumping chamber 38 and fuel rail 44 is achieved. Pressure relief valve assembly 48 is oriented such that fuel is allowed to flow into of pumping chamber 38 through pressure relief valve assembly 48, however, fuel is not allowed to flow out of pumping chamber 38 through pressure relief valve assembly 48.

Inlet valve assembly 40 will now be described with particular reference to FIGS. 3-7. Inlet valve assembly 40 includes a valve body 50, a valve spool 52 located within valve body 50, a check valve 54, and a solenoid assembly 55. The various elements of inlet valve assembly 40 will be described in greater detail in the paragraphs that follow. While the following description of inlet valve assembly 40 will illustrate solenoid assembly 55 being operated as a linear solenoid which allows for positioning of inlet valve assembly 40 at many discrete positions, it should be understood that solenoid assembly 55 may alternatively be modified to be operated as an on/off solenoid which allows for only two operational positions of valve assembly 40.

Valve body 50 is centered about, and extends along, a valve body axis 56 such that valve body 50 extends from a valve body first end 50a to a valve body second end 50b. A valve body bore 58 extends into valve body 50 from valve body first end 50a and terminates at a valve body end wall 60 which extends to valve body second end 50b such that valve body bore 58 is preferably cylindrical. A valve body first inlet passage 62 extends through valve body 50 such that valve body first inlet passage 62 extends from a valve body outer periphery 50c of valve body 50 and opens into valve body bore 58. A valve body second inlet passage 64 (not visible in FIG. 3, but visible in FIGS. 4-7) extends through valve body 50 such that valve body second inlet passage 64 extends from valve body outer periphery 50c and opens into valve body bore 58. As shown in the figures, valve body first inlet passage 62 and valve body second inlet passage 64 are spaced axially apart from each other along valve body axis 56 such that valve body second inlet passage 64 is located axially between valve body first end 50a and valve body first inlet passage 62. Also as shown in the figures, a plurality of valve body first inlet passages 62 may be provided such that each valve body first inlet passage 62 is located in the same axial location along valve body axis 56, however, each valve body first inlet passage 62 is spaced apart from the other valve body first inlet passages 62 around valve body outer periphery 50c. While only one valve body second inlet passage 64 is illustrated, it should be understood that a plurality of valve body second inlet passages 64 may be provided at the same axial location along valve body axis 56 but spaced apart from each other around valve body outer periphery 50c.

A valve body central passage 66 extends through valve body end wall 60 such that valve body central passage 66 connects valve body second end 50b with valve body bore 58 and such that valve body central passage 66 is centered about, and extends along, valve body axis 56. A plurality of valve body outlet passages 68 is provided in valve body end wall 60 such that each valve body outlet passage 68 extends through valve body end wall 60 and such that each valve body outlet passage 68 connects valve body second end 50b with valve body bore 58. Each valve body outlet passage 68 is laterally offset from valve body central passage 66 and extends through valve body end wall 60 in a direction parallel to valve body axis 56.

As shown in the figures, valve body outer periphery 50c may include three sections of distinct diameters. A valve body outer periphery first portion 50d of valve body outer periphery 50c begins at valve body first end 50a and extends to a valve body outer periphery second portion 50e of valve body outer periphery 50c such that valve body outer periphery first portion 50d is smaller in diameter than valve body outer periphery second portion 50e. As shown in the figures, valve body outer periphery first portion 50d may be located entirely outside of pump housing inlet passage 41 and valve body outer periphery second portion 50e includes valve body first inlet passage 62 and valve body second inlet passage 64 such that valve body first inlet passage 62 and valve body second inlet passage 64 are each in constant fluid communication with the portion of pump housing inlet passage 41 that is upstream of inlet valve assembly 40, i.e. valve body first inlet passage 62 and valve body second inlet passage 64 are each in constant fluid communication with the portion of pump housing inlet passage 41 that is between inlet valve assembly 40 and low-pressure fuel pump 18. A valve body outer periphery third portion 50f of valve body outer periphery 50c extends from valve body outer periphery second portion 50e to valve body second end 50b such that valve body outer periphery third portion 50f is larger in diameter than valve body outer periphery second portion 50e. Valve body outer periphery third portion 50f is sealingly engaged with pump housing inlet passage 41 such that fluid communication through pump housing inlet passage 41 past inlet valve assembly 40 at the interface of pump housing inlet passage 41 and valve body outer periphery third portion 50f is prevented and fluid communication through pump housing inlet passage 41 past inlet valve assembly 40 is only possible through valve body bore 58.

Valve spool 52 is made of a magnetic material and is centered about, and extends along, valve body axis 56 from a valve spool first end 52a to a valve spool second end 52b. Valve spool 52 includes a valve spool first portion 52c which is proximal to valve spool first end 52a and a valve spool second portion 52d which is proximal to valve spool second end 52b. Valve spool first portion 52c has a valve spool outer periphery 52e which is complementary with valve body bore 58 such that valve spool outer periphery 52e and valve body bore 58 are sized in order to substantially prevent fuel from passing between the interface of valve spool outer periphery 52e and valve body bore 58. As used herein, substantially preventing fuel from passing between the interface of valve spool outer periphery 52e and valve body bore 58 encompasses permitting small amounts of fuel passing between the interface which still allows operation of high-pressure fuel pump 20 as will readily be recognized by a practitioner of ordinary skill in the art. Valve spool second portion 52d includes a base portion 52f which extends from valve spool first portion 52c such that base portion 52f is smaller in diameter than valve spool first portion 52c, thereby providing an annular space radially between base portion 52f and valve body bore 58. Valve spool second portion 52d also include a tip portion 52g which extend from base portion 52f and terminates at valve spool second end 52b. Tip portion 52g is smaller in diameter than base portion 52f, thereby defining a valve spool shoulder 52h where tip portion 52g meets base portion 52f. Tip portion 52g is sized to be located within valve body central passage 66 of valve body 50 such that tip portion 52g is able to slide freely within valve body central passage 66 in the direction of valve body axis 56. In use, tip portion 52g is used to interface with check valve 54 as will be described in greater detail later.

Valve spool first portion 52c is provided with a valve spool groove 70 which extends radially inward from valve spool outer periphery 52e such that valve spool groove 70 is annular in shape. Valve spool groove 70 is selectively aligned or not aligned with valve body first inlet passage 62 and valve body second inlet passage 64 in order to control fluid communication through pump housing inlet passage 41 as will be described in greater detail later. One or more valve spool passages 72 is provided which extend from valve spool groove 70 through valve spool first portion 52c toward valve spool second end 52b, thereby providing fluid communication between valve spool groove 70 and valve body outlet passages 68.

A valve spool end bore 74 extends into valve spool 52 from valve spool first end 52a. As shown, valve spool end bore 74 may include a valve spool end bore first portion 74a which is an internal frustoconical shape and a valve spool end bore second portion 74b which is cylindrical and terminates with a valve spool end bore bottom 74c. A valve spool connecting passage 76 provides fluid communication between valve spool groove 70 and valve spool end bore 74 such that, as shown in the figures, valve spool connecting passage 76 may be formed, by way of non-limiting example only, by a pair of perpendicular drillings.

Check valve 54 includes a check valve member 78 and a travel limiter 80. Check valve 54 is arranged at valve spool second end 52b such that check valve member 78 is moved between a seated position which blocks valve body outlet passages 68 (shown in FIGS. 5-7) and an open position which unblocks valve body outlet passages 68 (shown in FIG. 4) as will be described in greater detail later. Check valve member 78 includes a check valve central portion 78a which is a flat plate with check valve passages 78b extending therethrough where it is noted that only select check valve passages 78b have been labeled in FIG. 3 for clarity. Check valve passages 78b are arranged through check valve central portion 78a such that check valve passages 78b are not axially aligned with valve body outlet passages 68. A plurality of check valve legs 78c extend from check valve central portion 78a such that check valve legs 78c are resilient and compliant. Free ends of check valve legs 78c are fixed to valve body second end 50b, for example, by welding. Consequently, when the pressure differential between valve body bore 58 and pumping chamber 38 is sufficiently high, check valve central portion 78a is allowed to unseat from valve spool 52 due to elastic deformation of check valve legs 78c, thereby opening valve body outlet passages 68. Travel limiter 80 includes a travel limiter ring 80a which is axially spaced apart from valve body second end 50b to provide the allowable amount of displacement of check valve member 78. Travel limiter 80 also includes a plurality of travel limiter legs 80b which provides the axial spacing between travel limiter ring 80a and valve body second end 50b. Travel limiter legs 80b are integrally formed with travel limiter ring 80a and are fixed to valve body second end 50b, for example by welding.

Solenoid assembly 55 includes a solenoid inner housing 82, a pole piece 84 located within solenoid inner housing 82, a return spring 86, a spool 88, a coil 90, an overmold 92, and a solenoid outer housing 94. The various elements of solenoid assembly 55 will be described in greater detail in the paragraphs that follow.

Solenoid inner housing 82 is hollow and is stepped both internally and externally such that an inner housing first portion 82a is open and larger in diameter than an inner housing second portion 82b which is closed. Solenoid inner housing 82 is centered about, and extends along valve body axis 56. The outer periphery of inner housing first portion 82a sealingly engages fuel pump housing 28 in order to prevent leakage of fuel from pump housing inlet passage 41 to the exterior of high-pressure fuel pump 20 and an annular gap is provided between the inner periphery of inner housing first portion 82a and valve body outer periphery second portion 50e in order to provide fluid communication between pump housing inlet passage 41 and valve body second inlet passage 64. The inner periphery of inner housing second portion 82b mates with valve body outer periphery first portion 50d to prevent communication of fuel between the interface of the inner periphery of inner housing second portion 82b and valve body outer periphery first portion 50d.

Pole piece 84 is made of a magnetically permeable material and is received within inner housing second portion 82b such that pole piece 84 is centered about, and extends along, valve body axis 56. A pole piece first end 84a is frustoconical such that the angle of pole piece first end 84a is complementary to the angle of valve spool end bore first portion 74a. In this way, pole piece first end 84a is received within valve spool end bore first portion 74a. A pole piece second end 84b, which is opposed to pole piece first end 84a, is located at the closed end of solenoid inner housing 82. A pole piece bore 84c extends axially through pole piece 84 from pole piece first end 84a to pole piece second end 84b such that the larger diameter portion of pole piece bore 84c extends into pole piece 84 from pole piece first end 84a, thereby defining a pole piece shoulder 84d which faces toward valve spool bore bottom 74c. Return spring 86 is received partially with pole piece bore 84c such that return spring 86 abuts pole piece shoulder 84d. Return spring 86 is also partially received within valve spool end bore second portion 74b and abuts valve spool end bore bottom 74c. Return spring 86 is held in compression between pole piece shoulder 84d and valve spool end bore bottom 74c, and in this way, return spring 86 biases valve spool 52 away from pole piece 84.

Spool 88 is made of an electrically insulative material, for example plastic, and is centered about, and extends along, valve body axis 56 such that spool 88 circumferentially surrounds inner housing second portion 82b in a close-fitting relationship. Coil 90 is a winding of electrically conductive wire which is wound about the outer periphery of spool 88 such that coil 90 circumferentially surrounds pole piece 84. Consequently, when coil 90 is energized with an electric current, valve spool 52 is magnetically attracted to, and moved toward, pole piece 84 and when coil 90 is not energized with an electric current, valve spool 52 is moved away from pole piece 84 by return spring 86. A more detailed description of operation will be provided later.

Solenoid outer housing 94 circumferentially surrounds solenoid inner housing 82, spool 88, and coil 90 such that spool 88 and coil 90 are located radially between solenoid inner housing 82 and solenoid outer housing 94. Solenoid outer housing 94 is fixed to fuel pump housing 28 by welding, illustrated in FIG. 2 by the darkened areas and designated with reference character W2. Overmold 92 is an electrically insulative material, for example plastic, which fills the void between spool 88/coil 90 and solenoid outer housing 94 such that overmold 92 extends axially from solenoid outer housing 94 to define an electrical connector 96 which includes terminals (not shown) that are connected to opposite ends of coil 90. Electrical connector 96 is configured to mate with a complementary electrical connector (not show) for supplying electric current to coil 90 in use. As shown, a coil washer 98 may be provided within solenoid outer housing 94 axially between coil 90 and overmold 92 in order to complete the magnetic circuit of solenoid assembly 55.

Figure 4:
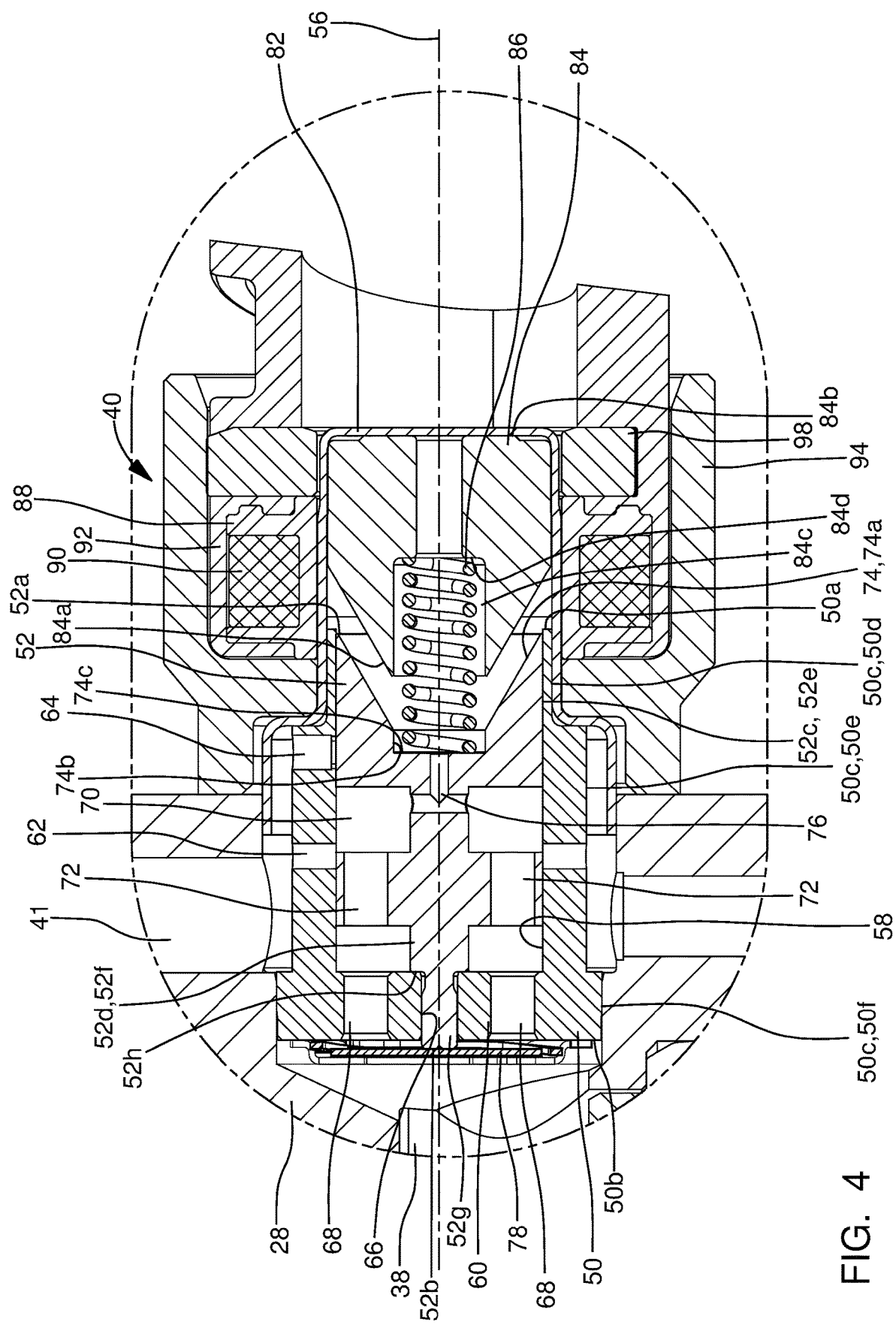
FIG. 4 is an enlargement of a portion of FIG. 2 showing the inlet valve assembly of the fuel pump in a first position.

Operation of high-pressure fuel pump 20, and in particular, inlet valve assembly 40, will now be described with particular reference to FIG. 4 which shows valve spool 52 in a first position which results from no electric current being supplied to coil 90 of solenoid assembly 55. When no electric current is supplied to coil 90, return spring 86 urges valve spool 52 away from pole piece 84 until valve spool shoulder 52h abuts valve body end wall 60 which allows tip portion 52g of valve spool 52 to protrude beyond valve body second end 50b such that tip portion 52g holds check valve member 78 in an unseated position which permits flow through valve body outlet passages 68 and such that valve body outlet passages 68 are in fluid communication with pumping chamber 38. Also in the first position, valve spool groove 70 is aligned with valve body first inlet passage 62, however, it is noted that valve spool groove 70 is not aligned with valve body second inlet passage 64. In this way, valve spool 52 maintains check valve member 78 in the unseated position and valve body first inlet passage 62 is in fluid communication with valve body outlet passages 68. It should be noted that in the first position, alignment between valve spool groove 70 and valve body first inlet passage 62 provides a path to pump housing inlet passage 41. In this way, the first position is a default position that provides limp-home operation of high-pressure fuel pump 20, that is, if electrical power to solenoid assembly 55 is unintentionally interrupted, fuel in sufficient quantity and pressure is supplied to fuel injectors 16 by low-pressure fuel pump 18 for continued operation of internal combustion engine 12, although without the fuel being pressurized by high-pressure fuel pump 20 since check valve member 78 being held in the unseated position by valve spool 52 prevents pressurization of fuel by pumping plunger 34. It should be noted that the path to pump housing inlet passage 41 which enables the limp-home operation of high-pressure fuel pump 20 also enables the use of only one pressure-relief valve, i.e. pressure relief valve assembly 48.

Figure 5:
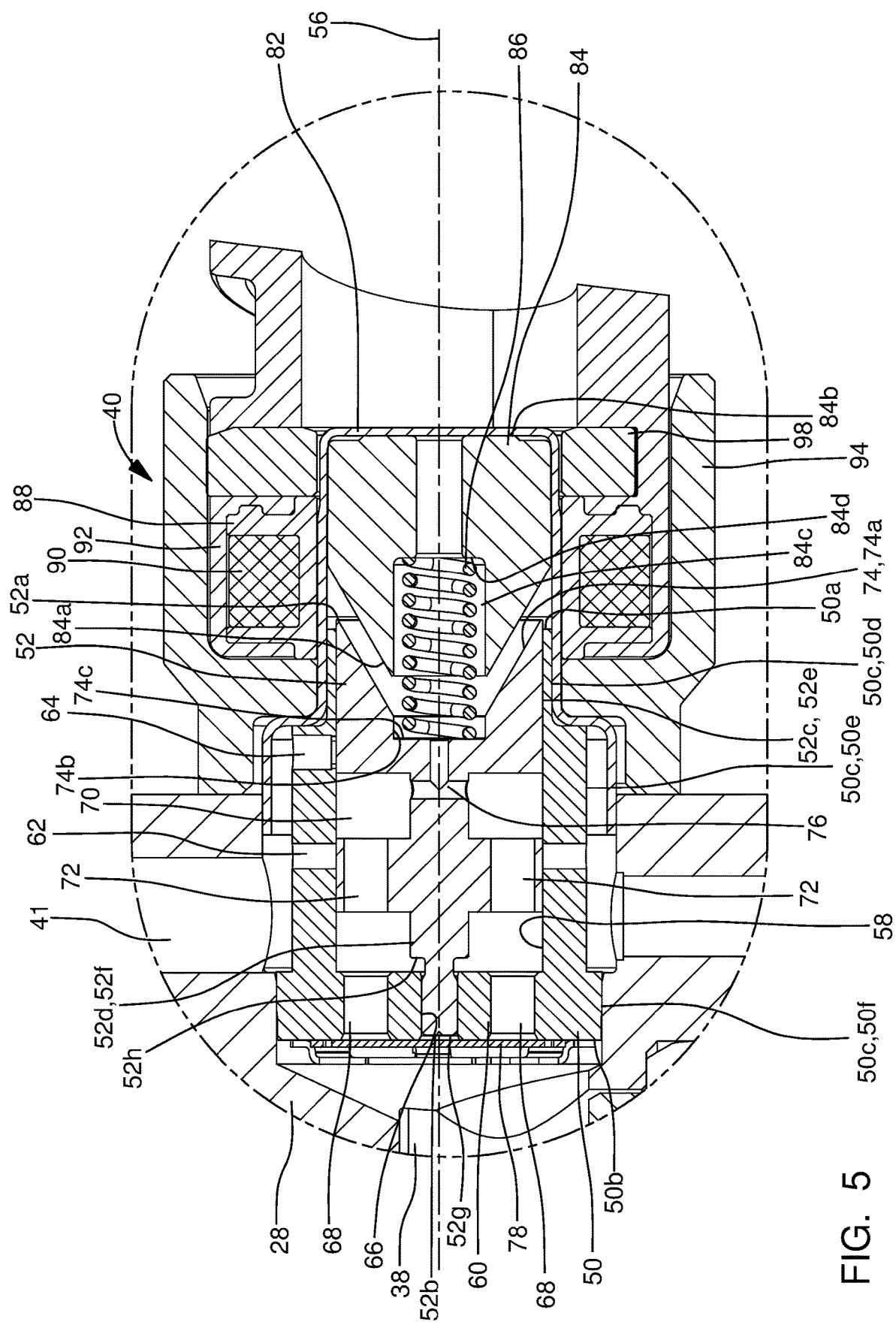
FIG. 5 is the view of FIG. 4, now showing the inlet valve assembly in a second position.

Now with particular reference to FIG. 5, valve spool 52 is shown in a second position which results from electric current being supplied to coil 90 of solenoid assembly 55 at a first duty cycle. When electric current is supplied to coil 90 at the first duty cycle, valve spool 52 is attracted to pole piece 84, thereby moving valve spool 52 toward pole piece 84 and compressing return spring 86 to a greater extent than in the first position. Valve spool connecting passage 76 allows fuel located between valve spool 52 and pole piece 84 to be displaced toward valve body outlet passages 68 during movement of valve spool 52 toward pole piece 84 and also allows pressure to equalize on each axial end of valve spool 52. In the second position, tip portion 52g is positioned to no longer protrude beyond valve body second end 50b, and consequently, check valve member 78 is moved to a seated position which prevents flow into valve body bore 58 through valve body outlet passages 68. Also in the second position, valve spool groove 70 is not aligned with valve body first inlet passage 62 and is also not aligned with valve body second inlet passage 64, and in this way, fuel is prevented from entering or exiting valve body bore 58 through valve body first inlet passage 62 and valve body second inlet passage 64. Consequently, valve body first inlet passage 62 and valve body second inlet passage 64 is not in fluid communication with valve body outlet passages 68. The second position of valve spool 52 is used when internal combustion engine 12 is in operation but is not requesting fuel to be supplied from fuel injectors 16 as may occur during a fuel deceleration cutoff event when an automobile is coasting and no fuel is being commanded. In this way, the second position prevents fuel from being supplied to fuel injectors 16.

Figure 6:
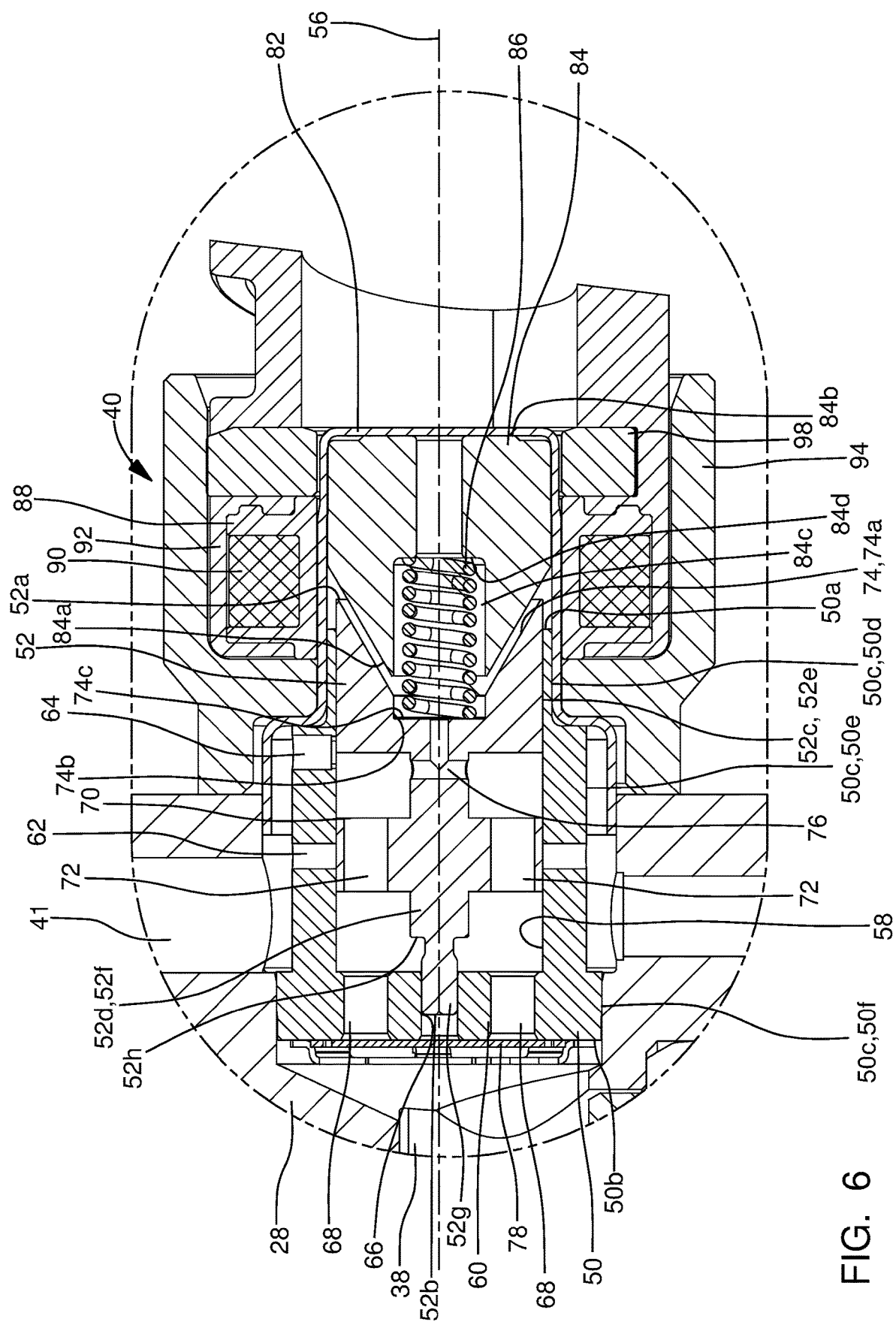
FIG. 6 is the view of FIGS. 4 and 5, now showing the inlet valve assembly in a third position.

Now with particular reference to FIG. 6, valve spool 52 is shown in a third position which results from electric current being supplied to coil 90 of solenoid assembly 55 at a second duty cycle which is greater than the first duty cycle used to achieve the second position of valve spool 52. When electric current is supplied to coil 90 at the second duty cycle, valve spool 52 is attracted to pole piece 84, thereby moving valve spool 52 toward pole piece 84 and compressing return spring 86 to a greater extent than in the second position. Just as in the second position, the third position results in tip portion 52g being positioned to no longer protrude beyond valve body second end 50b, and consequently, check valve member 78 is moved to a seated position which prevents flow into valve body bore 58 through valve body outlet passages 68. However, it should be noted that check valve member 78 is able to move to the unseated position when the pressure differential between valve body bore 58 and pumping chamber 38 is sufficiently high, i.e. during the intake stroke. Also in the third position, valve spool groove 70 is not aligned with valve body first inlet passage 62, however, valve spool groove 70 is now aligned with valve body second inlet passage 64, and in this way, fuel is allowed to valve body bore 58 through valve body second inlet passage 64. Consequently, during the intake stroke of pumping plunger 34, a pressure differential is created which allows fuel to flow through inlet valve assembly 40 through valve body second inlet passage 64, thereby moving check valve member 78 to the unseated position which allows fuel to flow into pumping chamber 38. During the compression stroke of pumping plunger 34, pressure increases within pumping chamber 38, thereby causing check valve member 78 to move to the seated position which prevents fuel from flowing from pumping chamber 38 into valve body bore 58 and which allows the pressurized fuel within pumping chamber 38 to be discharged through outlet valve 42. The third position of valve spool 52 is used when internal combustion engine 12 is required to produce a light output torque since it is noted that alignment of valve spool groove 70 with valve body second inlet passage 64 provides a restricted passage which thereby meters a small amount of fuel to pumping chamber 38 during the intake stroke of pumping plunger 34 to support fueling of internal combustion engine 12 at light loads.

Figure 7:
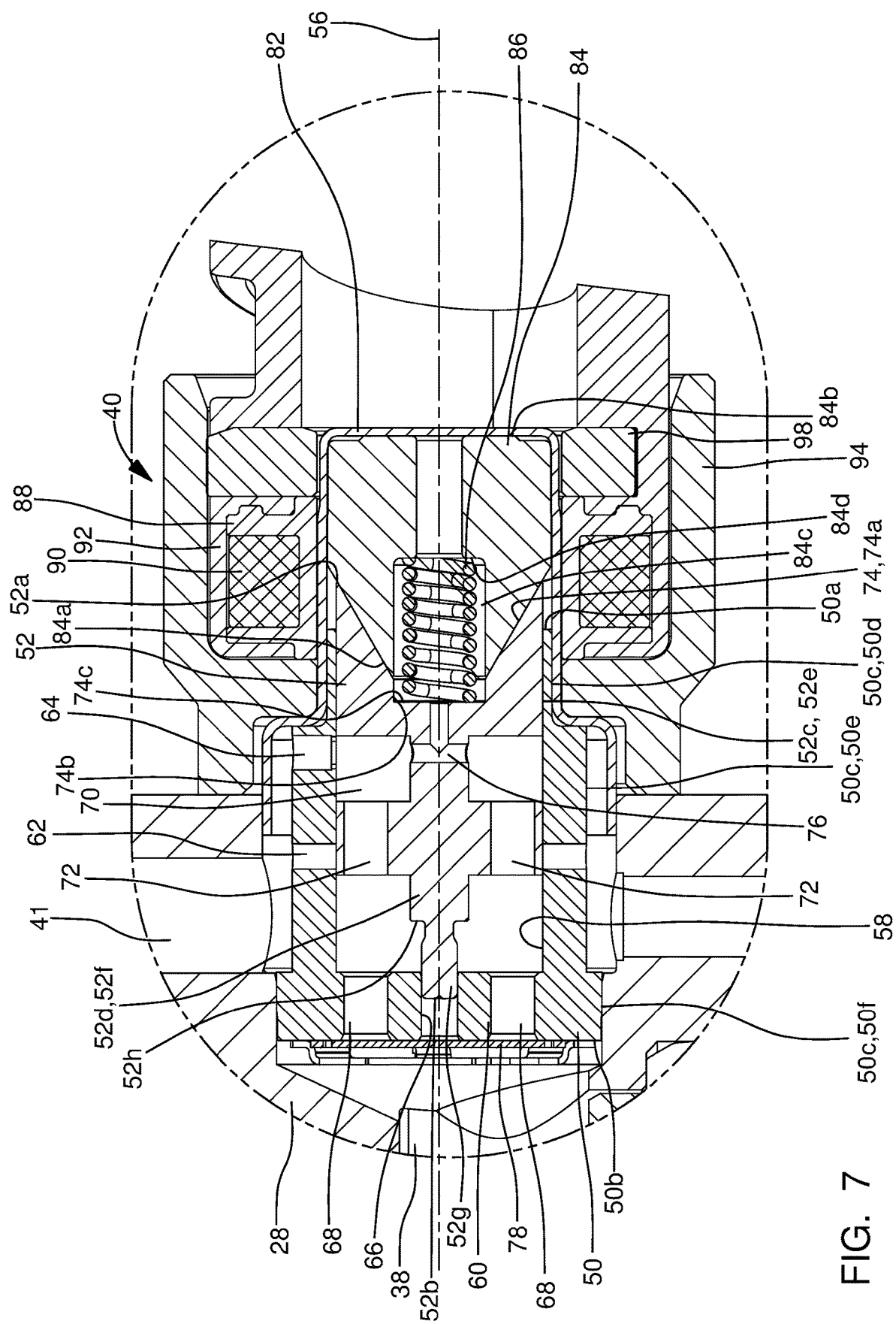
FIG. 7 is the view of FIGS. 4-6, now showing the inlet valve assembly in a fourth position.

Now with particular reference to FIG. 7, valve spool 52 is shown in a fourth position which results from electric current being supplied to coil 90 of solenoid assembly 55 at a third duty cycle which is greater than the second duty cycle used to achieve the third position of valve spool 52. When electric current is supplied to coil 90 at the third duty cycle, valve spool 52 is attracted to pole piece 84, thereby moving valve spool 52 toward pole piece 84 and compressing return spring 86 to a greater extent than in the third position. Just as in the second and third positions, the fourth position results in tip portion 52g being positioned to no longer protrude beyond valve body second end 50b, and consequently, check valve member 78 is moved to a seated position which prevents flow into valve body bore 58 through valve body outlet passages 68. However, it should be noted that check valve member 78 is able to move to the unseated position when the pressure differential between valve body bore 58 and pumping chamber 38 is sufficiently high, i.e. during the intake stroke. Also in the fourth position, just as in the third position, valve spool groove 70 is not aligned with valve body first inlet passage 62, however, valve spool groove 70 is now aligned with valve body second inlet passage 64, and in this way, fuel is allowed to valve body bore 58 through valve body second inlet passage 64. Consequently, during the intake stroke of pumping plunger 34, a pressure differential is created which allows fuel to flow through inlet valve assembly 40 through valve body second inlet passage 64, thereby moving check valve member 78 to the unseated position which allows fuel to flow into pumping chamber 38. During the compression stroke of pumping plunger 34, pressure increases within pumping chamber 38, thereby causing check valve member 78 to move to the seated position which prevents fuel from flowing from pumping chamber 38 into valve body bore 58 and which allows the pressurized fuel within pumping chamber 38 to be discharged through outlet valve 42. As should now be apparent, the third and fourth positions of valve spool 52 are nearly identical, however, the fourth position differs from the third position in that the alignment of valve spool groove 70 with valve body second inlet passage 64 is less restrictive than in the third position. Consequently, the fourth position of valve spool 52 is used when internal combustion engine 12 is required to produce a higher output torque since the alignment of valve spool groove 70 with valve body second inlet passage 64 provides a less restrictive passage which thereby meters a larger amount of fuel, compared to the third position, to pumping chamber 38 during the intake stroke of pumping plunger 34 to support fueling of internal combustion engine 12 at high loads.

As should now be clear, different duty cycles can be provided to vary the amount of fuel metered to pumping chamber 38 where the different duty cycles result in varying magnitudes of alignment of valve spool groove 70 with valve body second inlet passage 64, thereby varying the magnitude of restriction. In other words, the third and fourth positions as described above are only examples of positions of valve spool 52, and other duty cycles can be provided in order to provide different metered amounts of fuel to pumping chamber 38 in order to achieve different output torques of internal combustion engine 12. An electronic control unit 100 may be used to supply electric current to coil 90 at the various duty cycles described herein. Electronic control unit 100 may receive input from a pressure sensor 102 which senses the pressure within fuel rail 44 in order to provide a proper duty cycle to coil 90 in order to maintain a desired pressure in fuel rail 44 which may vary based on the commanded torque desired to be produced by internal combustion engine 12.

Figure 8:
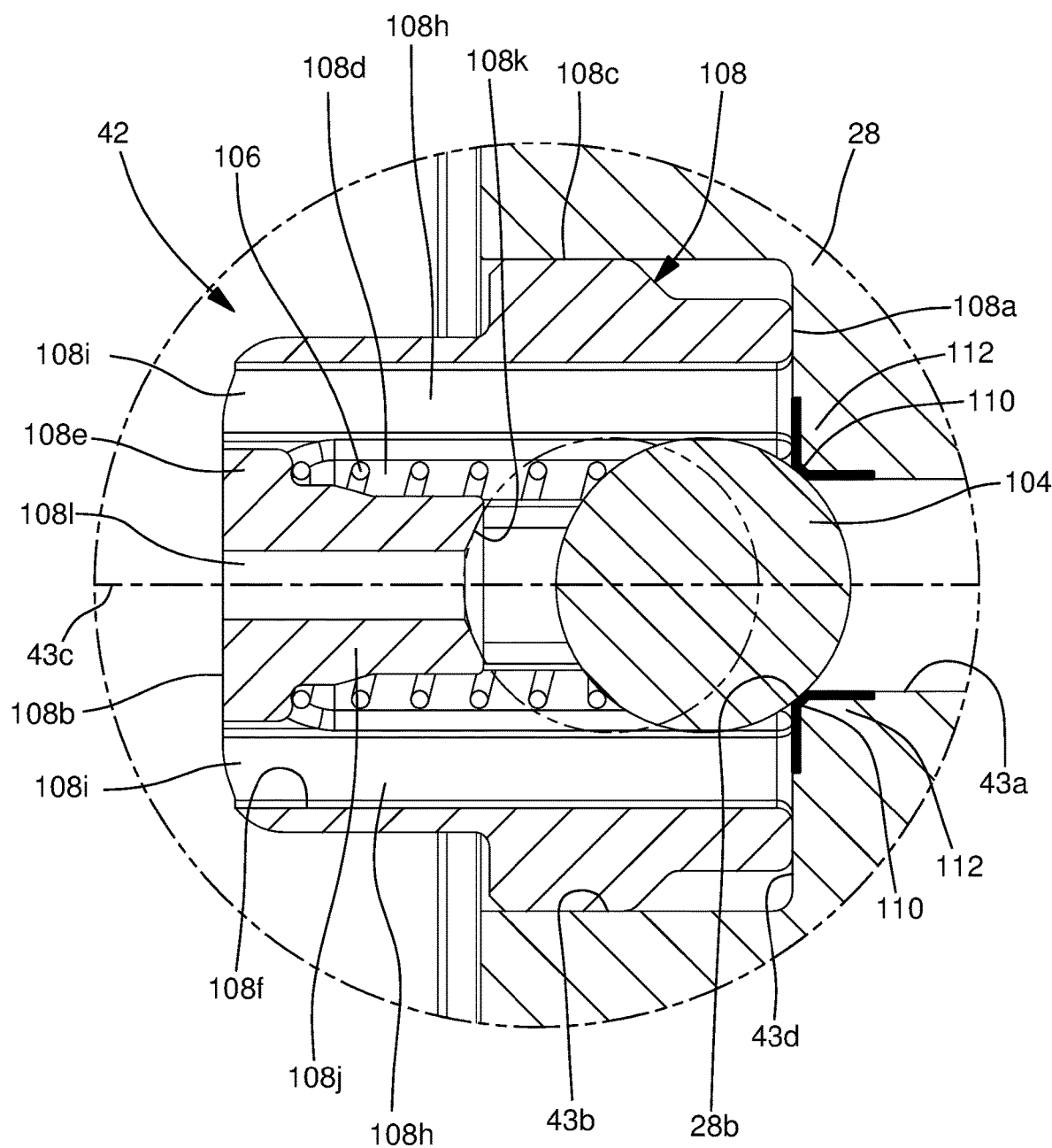
FIG. 8 is an enlargement of a portion of FIG. 2 showing an outlet valve of the fuel pump.
Figure 9:
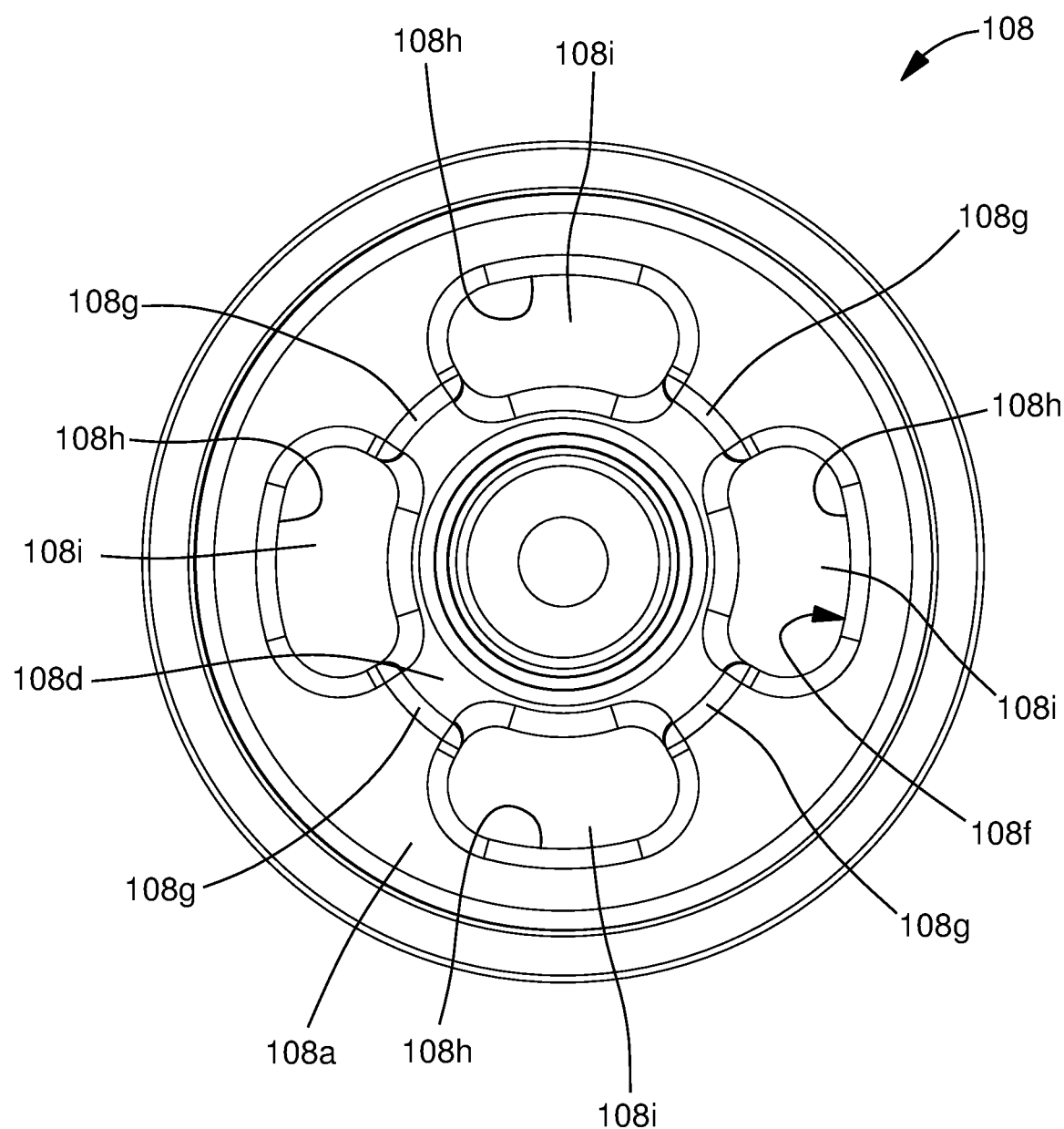
FIG. 9 is an end view of an outlet valve cage of the outlet valve.

Outlet valve 42 will now be described with particular reference to FIGS. 8 and 9. Outlet valve 42 includes an outlet valve seating surface 28b which is formed by fuel pump housing 28 within outlet passage 43, an outlet valve member 104, an outlet valve spring 106, and an outlet valve member cage 108. The various elements of outlet valve 42 will be described in greater detail in the paragraphs that follow.

Outlet valve seating surface 28b is defined integrally, and unitarily, with fuel pump housing 28. More specifically, outlet passage 43 is stepped by having an outlet passage first portion 43a which is proximal to pumping chamber 38 and an outlet passage second portion 43b which is distal from pumping chamber 38. Outlet passage first portion 43a and outlet passage second portion 43b are each cylindrical and are centered about, and extend along, an outlet passage axis 43c such that outlet passage first portion 43a is smaller in diameter than outlet passage second portion 43b. As a result, an outlet passage shoulder 43d, which is traverse to outlet passage axis 43c, is formed between outlet passage first portion 43a and outlet passage second portion 43b, and as shown, outlet passage shoulder 43d may be perpendicular to outlet passage axis 43c. As shown, outlet valve seating surface 28b may be frustoconical in shape by being formed as a chamfer which joins outlet passage shoulder 43d to outlet passage first portion 43a. Alternatively, outlet valve seating surface 28b may be frustospherical in shape. In a further alternative, outlet valve seating surface 28b may be an intersection of outlet passage shoulder 43d and outlet passage first portion 43a. In yet a further alternative, outlet passage shoulder 43d may be oblique to outlet passage axis 43c and outlet valve seating surface 28b may be outlet passage shoulder 43d.

A region of case hardness 110 extends from outlet valve seating surface 28b into fuel pump housing 28. Region of case hardness 110, hereinafter referred to as nitrided layer 110, may preferably be a nitrided layer which extends from outlet valve seating surface 28b into fuel pump housing 28. Nitrided layer 110 has a first hardness while a surrounding region 112 of fuel pump housing 28 which extends from nitrided layer 110 has a second hardness which is less than the first hardness. Nitrided layer 110 preferably has a minimum depth of 75 μm and has a minimum hardness of 720 HV (Vickers). For comparison, surrounding region 112 may have a hardness in the range of 200 HV to 250 HV. Nitrided layer 110 not only extends into fuel pump housing 28 from outlet valve seating surface 28b, but also from a portion of outlet passage shoulder 43d and from a portion of outlet passage first portion 43a. As an example, nitrided layer 110 may extend from outlet passage shoulder 43d for about half the distance from outlet valve seating surface 28b to outlet passage second portion 43b and nitrided layer 110 may extend along outlet passage first portion 43a for a similar distance as on outlet passage shoulder 43d. By having nitrided layer 110 not limited only to extending from outlet valve seating surface 28b, the robustness of the nitrided lay 110 may be improved by moving the transition of the hard and soft surfaces further away from the area impacted by outlet valve member 104. It should be noted that the thickness, i.e. a direction perpendicular to the surface being hardened, of nitrided layer 110 illustrated as a darkened area in FIG. 8 of fuel pump housing 28 may be exaggerated for illustrative purposes and is not intended to necessarily represent the true thickness of nitrided layer 110.

Nitrided layer 110 may be formed through one of gas nitriding, salt bath nitriding, or plasma nitriding. In gas nitriding, the area to be hardened, i.e. outlet valve seating surface 28b, is heated and subjected to a nitrogen rich gas. In salt bath nitriding, the area to be hardened, i.e. outlet valve seating surface 28b, is heated and subjected to a nitrogen-containing salt. In plasma nitriding, the area to be hardened, i.e. outlet valve seating surface 28b, is subjected to a plasma gas, which may typically be pure nitrogen. In each of the methods, the surfaces that are not intended to be hardened, are masked to prevent contact with the gas, salt, or plasma, thereby limiting nitrided layer 110 only to the desired area. Further details of the nitriding processes will not be discussed herein and would be known to those of skill in the art of nitriding. For example, a practitioner of ordinary skill in the art would be able to determine the specific temperatures and exposure durations for the gas, salt, or plasma for the specific material used for fuel pump housing 28 and for the desired hardness of outlet valve seating surface 28b.

Outlet valve member 104 may be a simple ball, i.e. sphere, as shown, or may alternatively be, by way of non-limiting example only, a portion of a sphere, a conical member, or a frustoconical member. No matter the form, outlet valve member 104 is configured to prevent fluid communication through outlet passage 43 when outlet valve member 104 is in a seated position where outlet valve member 104 engages on outlet valve seating surface 28b.

Outlet valve member cage 108 extends along outlet passage axis 43c from a cage first end 108a to a cage second end 108b such that cage first end 108a is proximal to pumping chamber 38 and cage second end 108b is distal from pumping chamber 38. As shown, cage first end 108a abuts outlet passage shoulder 43d. A cage outer periphery 108c is fixed to outlet passage second portion 43b, for example, by circumferential interference fit between cage outer periphery 108c and outlet passage second portion 43b.

Outlet valve member cage 108 includes a cage internal volume 108d which extends from cage first end 108a to a cage end wall 108e which traverses cage second end 108b. An inner wall surface 108f of outlet valve member cage 108 is defined by alternating inward extending cage ribs 108g and cage passages 108h. As illustrated herein, there are four cage ribs 108g and four cage passages 108h, however, other quantities are possible. Cage ribs 108g are preferably equally spaced about outlet passage axis 43c as shown and extend inward sufficiently far to provide guidance to outlet valve member 104, thereby limiting the extent to which outlet valve member 104 is able to move laterally relative to outlet passage axis 43c. Cage passages 108h are spaced laterally away from outlet passage axis 43c a greater amount than cage ribs 108g, thereby provide a path for fuel flow around outlet valve member 104. A plurality of cage apertures 108i extend through cage end wall 108e such that each cage aperture 108i is aligned with a respective one of cage passages 108h, thereby providing a flow path out of cage internal volume 108d. A cage central post 108j extends axially from cage end wall 108e in a direction toward cage first end 108a and terminates at a cage central post tip 108k. Cage central post 108j is centered about outlet passage axis 43c such that cage central post 108j is circumferentially surrounded by cage ribs 108g and cage passages 108h. A cage central post passage 108l extends axially through cage central post 108j from cage central post tip 108k to cage second end 108b, thereby providing fluid communication therethrough.

Outlet valve spring 106 is a coil compression spring which is grounded to outlet valve member cage 108 at cage end wall 108e such that outlet valve spring 106 is located within cage internal volume 108d. Outlet valve spring 106 is held in compression between cage end wall 108e and outlet valve member 104 such that outlet valve member 104 is biased toward the seated position by outlet valve spring 106. In operation, when the pressure differential upstream of outlet valve member 104, i.e. to the right of outlet valve member 104 as oriented in the figures, and downstream of outlet valve member 104, i.e. to the left of outlet valve member 104 as oriented in the figures, is sufficient to overcome the force of outlet valve spring 106, outlet valve member 104 is moved to an unseated position (shown in phantom lines in FIG. 8) in which outlet valve member 104 is offset relative to outlet valve seating surface 28b, thereby providing fluid communication through outlet passage 43. Travel of outlet valve member 104 in the unseated position may be limited by outlet valve member 104 engaging cage central post tip 108k where it is noted that cage central post passage 108l prevents entrapment of fluid which could slow outlet valve member 104 in fully opening and also prevents suction which could slow outlet valve member 104 returning to the seated position.

High-pressure fuel pump 20 may additionally include pressure pulsation dampers 114 upstream of pump housing inlet passage 41 in order to dampen pressure pulsations generated during operation of high-pressure fuel pump 20. Pressure pulsation dampers 114 are well known to those of ordinary skill in the art and will not be described in greater detail herein. Pressure pulsation dampers 114 are contained within a pulsation damper housing 116 which is fixed to fuel pump housing 28 by welding as designated by the darkened areas identified by reference character W3 in FIG. 2.

High-pressure fuel pump 20 which includes outlet valve seating surface 28b formed by fuel pump housing 28 as described herein reduces the number of components by omitting a separately formed outlet valve seat and also lowers the overall cost since outlet valve seating surface 28b costs less to manufacture than a separate valve seat made of hardened stainless steel.

While this invention has been described in terms of preferred embodiments thereof, it is not intended to be so limited, but rather only to the extent set forth in the claims that follow.

We claim:

1. A fuel pump comprising:
a fuel pump housing made of stainless steel and having an outer surface, said fuel pump housing including a pumping chamber therewithin, a plunger bore extending thereinto from said outer surface to said pumping chamber, an inlet passage extending thereinto from said outer surface to said pumping chamber which allows fuel to flow into said pumping chamber, and an outlet passage extending thereinto from said outer surface to said pumping chamber which allows fuel to flow out of said pumping chamber;
a pumping plunger which reciprocates within said plunger bore along a plunger bore axis such that an intake stroke of said pumping plunger increases volume of said pumping chamber and a compression stroke of said pumping plunger decreases volume of said pumping chamber; and
an outlet valve which controls fuel flow from said pumping chamber out of said fuel pump housing, said outlet valve comprising:
an outlet valve seating surface formed by said fuel pump housing within said outlet passage such that a nitrided layer extends from said outlet valve seating surface into said fuel pump housing; and
an outlet valve member within said outlet passage, said outlet valve member being moveable between 1) a seated position in which said outlet valve member engages said outlet valve seating surface, thereby preventing fluid communication through said outlet passage and 2) an unseated position in which said outlet valve member is offset relative to said outlet valve seating surface, thereby providing fluid communication through said outlet passage;
wherein said outlet passage comprises:
an outlet passage first portion which is proximal to said pumping chamber and which extends along an outlet passage axis;
an outlet passage second portion which is distal from said pumping chamber and which is larger in diameter than said outlet passage first portion; and
an outlet passage shoulder between said outlet passage first portion and said outlet passage second portion such that said outlet passage shoulder is traverse to said outlet passage axis;
wherein said outlet valve seating surface is formed between said outlet passage first portion and said outlet passage second portion;
wherein said outlet valve seating surface joins said outlet passage shoulder and said outlet passage first portion;
wherein said nitrided layer extends from said outlet passage shoulder into said fuel pump housing; and
wherein said nitrided layer extends from said outlet passage first portion into said fuel pump housing.

2. A fuel pump as in claim 1, where said nitrided layer has a first hardness and a surrounding region of said fuel pump housing which extends from said nitrided layer has a second hardness which is less than said first hardness.

3. A fuel pump as in claim 2, wherein:
said first hardness is a minimum of 720 HV; and
said second hardness is in a range of 200 HV to 250 HV.

4. A fuel pump as in claim 1 further comprising an outlet valve member cage fixed within said outlet passage second portion, said outlet valve member cage including a cage internal volume within which said outlet valve member is captured.

5. A fuel pump as in claim 4 further comprising an outlet valve spring which is grounded to said outlet valve member cage such that said outlet valve spring biases said outlet valve member toward said seated position.

6. A fuel pump as in claim 4, wherein said outlet valve member cage abuts said outlet passage shoulder.

7. A fuel pump comprising:

a fuel pump housing made of stainless steel and having an outer surface, said fuel pump housing including a pumping chamber therewithin, a plunger bore extending thereinto from said outer surface to said pumping chamber, an inlet passage extending thereinto from said outer surface to said pumping chamber which allows fuel to flow into said pumping chamber, and an outlet passage extending thereinto from said outer surface to said pumping chamber which allows fuel to flow out of said pumping chamber;

a pumping plunger which reciprocates within said plunger bore along a plunger bore axis such that an intake stroke of said pumping plunger increases volume of said pumping chamber and a compression stroke of said pumping plunger decreases volume of said pumping chamber; and an outlet valve which controls fuel flow from said pumping chamber out of said fuel pump housing, said outlet valve comprising:
- an outlet valve seating surface formed by said fuel pump housing within said outlet passage such that a nitrided layer extends from said outlet valve seating surface into said fuel pump housing; and
- an outlet valve member within said outlet passage, said outlet valve member being moveable between 1) a seated position in which said outlet valve member engages said outlet valve seating surface, thereby preventing fluid communication through said outlet passage and 2) an unseated position in which said outlet valve member is offset relative to said outlet valve seating surface, thereby providing fluid communication through said outlet passage;

wherein said outlet passage comprises:
- an outlet passage first portion which is proximal to said pumping chamber and which extends along an outlet passage axis;
- an outlet passage second portion which is distal from said pumping chamber and which is larger in diameter than said outlet passage first portion; and
- an outlet passage shoulder between said outlet passage first portion and said outlet passage second portion such that said outlet passage shoulder is traverse to said outlet passage axis;

wherein said outlet valve seating surface is formed between said outlet passage first portion and said outlet passage second portion;

wherein said outlet valve seating surface joins said outlet passage shoulder and said outlet passage first portion;

wherein said fuel pump further comprises an outlet valve member cage fixed within said outlet passage second portion, said outlet valve member cage including a cage internal volume within which said outlet valve member is captured;

wherein said outlet valve member cage includes an inner wall surface which is defined by alternating inwardly extending cage ribs and cage passages;

wherein said cage ribs limit an extent which said outlet valve member is able to move laterally relative to said outlet passage axis; and wherein said cage passages provide a path for fuel flow around said outlet valve member.

8. A fuel pump as in claim 7, wherein said outlet valve member cage includes a cage central post which limits travel of said outlet valve member when said outlet valve member is moved to the unseated position.

9. A fuel pump comprising:

a fuel pump housing made of stainless steel and having an outer surface, said fuel pump housing including a pumping chamber therewithin, a plunger bore extending thereinto from said outer surface to said pumping chamber, an inlet passage extending thereinto from said outer surface to said pumping chamber which allows fuel to flow into said pumping chamber, and an outlet passage extending thereinto from said outer surface to said pumping chamber which allows fuel to flow out of said pumping chamber;

a pumping plunger which reciprocates within said plunger bore along a plunger bore axis such that an intake stroke of said pumping plunger increases volume of said pumping chamber and a compression stroke of said pumping plunger decreases volume of said pumping chamber; and an outlet valve which controls fuel flow from said pumping chamber out of said fuel pump housing, said outlet valve comprising:
- an outlet valve seating surface formed by said fuel pump housing within said outlet passage such that a nitrided layer extends from said outlet valve seating surface into said fuel pump housing; and
- an outlet valve member within said outlet passage, said outlet valve member being moveable between 1) a seated position in which said outlet valve member engages said outlet valve seating surface, thereby preventing fluid communication through said outlet passage and 2) an unseated position in which said outlet valve member is offset relative to said outlet valve seating surface, thereby providing fluid communication through said outlet passage;

wherein said outlet passage comprises:
- an outlet passage first portion which is proximal to said pumping chamber and which extends along an outlet passage axis;
- an outlet passage second portion which is distal from said pumping chamber and which is larger in diameter than said outlet passage first portion; and
- an outlet passage shoulder between said outlet passage first portion and said outlet passage second portion such that said outlet passage shoulder is traverse to said outlet passage axis;

wherein said outlet valve seating surface is formed between said outlet passage first portion and said outlet passage second portion;

wherein said outlet valve seating surface joins said outlet passage shoulder and said outlet passage first portion;

wherein said fuel pump further comprises an outlet valve member cage fixed within said outlet passage second portion, said outlet valve member cage including a cage internal volume within which said outlet valve member is captured;

wherein said outlet valve member cage includes a cage central post which limits travel of said outlet valve member when said outlet valve member is moved to the unseated position;

wherein said cage central post includes a cage central post passage extending therethrough along said outlet passage axis.

10. A fuel pump comprising:

a fuel pump housing made of stainless steel and having an outer surface, said fuel pump housing including a pumping chamber therewithin, a plunger bore extending thereinto from said outer surface to said pumping chamber, an inlet passage extending thereinto from said outer surface to said pumping chamber which allows fuel to flow into said pumping chamber, and an outlet passage extending thereinto from said outer surface to said pumping chamber which allows fuel to flow out of said pumping chamber;

a pumping plunger which reciprocates within said plunger bore along a plunger bore axis such that an intake stroke of said pumping plunger increases volume of said pumping chamber and a compression stroke of said pumping plunger decreases volume of said pumping chamber; and an outlet valve which controls outlet fuel flow of said fuel pump, said outlet valve comprising:

an outlet valve seating surface formed by said fuel pump housing within said outlet passage such that a region of case hardness extends from said outlet valve seating surface into said fuel pump housing; and an outlet valve member within said outlet passage, said outlet valve member being moveable between 1) a seated position in which said outlet valve member engages said outlet valve seating surface, thereby preventing fluid communication through said outlet passage and 2) an unseated position in which said outlet valve member is offset relative to said outlet valve seating surface, thereby providing fluid communication through said outlet passage;

wherein said outlet passage comprises:

an outlet passage first portion which is proximal to said pumping chamber and which extends along an outlet passage axis;

an outlet passage second portion which is distal from said pumping chamber and which is larger in diameter than said outlet passage first portion; and an outlet passage shoulder between said outlet passage first portion and said outlet passage second portion such that said outlet passage shoulder is traverse to said outlet passage axis;

wherein said outlet valve seating surface is formed between said outlet passage first portion and said outlet passage second portion;

wherein said outlet valve seating surface joins said outlet passage shoulder and said outlet passage first portion;

wherein said region of case hardness extends from said outlet passage shoulder into said fuel pump housing; and wherein said region of case hardness extends from said outlet passage first portion into said fuel pump housing.

11. A fuel pump as in claim 10, where said region of case hardness has a first hardness and a surrounding region of said fuel pump housing which extends from said region of case hardness has a second hardness which is less than said first hardness.

12. A fuel pump as in claim 11, wherein:
said first hardness is a minimum of 720 HV; and
said second hardness is in a range of 200 HV to 250 HV.

* * * * *